(No Model.)

M. J. RUSSELL.
PISTON PACKING.

No. 383,253. Patented May 22, 1888.

Witnesses:
C. L. Sundgren.
Joseph W. Roe.

Inventor:
Michael J. Russell
by his Att'ys
Brown & Hall

UNITED STATES PATENT OFFICE.

MICHAEL J. RUSSELL, OF JERSEY CITY, NEW JERSEY.

PISTON-PACKING.

SPECIFICATION forming part of Letters Patent No. 383,253, dated May 22, 1888.

Application filed September 26, 1887. Serial No. 250,691. (No model.)

*To all whom it may concern:*

Be it known that I, MICHAEL J. RUSSELL, of Jersey City, in the county of Hudson and State of New Jersey, have invented a new and useful Improvement in Piston-Packings, of which the following is a specification.

My invention relates to pistons which are packed with metal rings; and the object of my invention is to so construct a packing-ring and place it in a piston that the pressure of steam upon one side of the ring will cause it to tighten itself against the wall of the cylinder, and to work without any shock or chatter in in the piston.

In carrying out my invention I construct the piston with a peripherical groove having its opposite faces or walls parallel to each other and oblique to the axis of the piston, and I provide a packing-ring which has its opposite sides parallel and correspondingly oblique and fitting in said groove, the ring preferably having that portion of its side on which the fluid acts and which projects beyond the piston a substantially flat surface in a plane at right angles to the axis of the piston. The portion of the piston on one side of its groove may be of less diameter than the portion on the other side thereof, and thus opportunity is afforded for the steam or other fluid to reach and press upon the flat surface of the ring, which is exposed beyond the piston portion of less diameter. When the piston has combined with it a follower or bull ring made separate therefrom, and which is of smaller diameter than the body of the piston, the groove for the packing-ring is formed between the body of the piston and the follower or bull ring.

The invention will be hereinafter more fully described, and pointed out in the claims.

Figure 1:
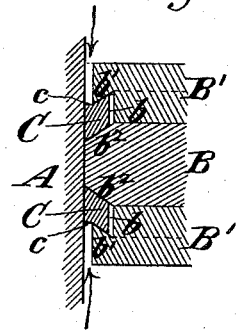
Figure 2:
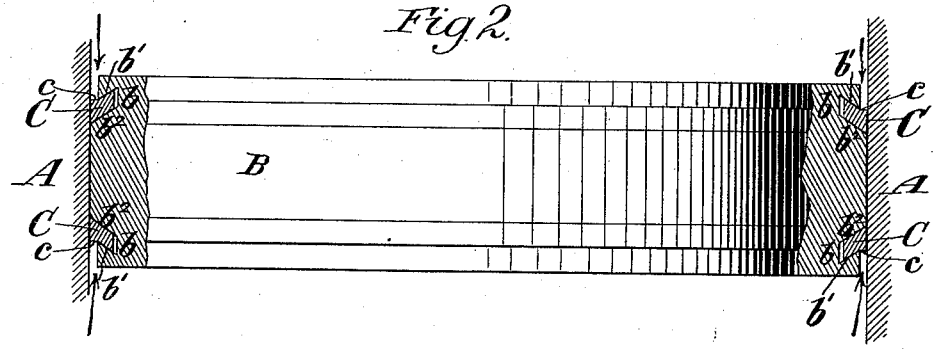

In the accompanying drawings, Figure 1 is a sectional view representing a portion of a piston having followers or bull rings separate from the body and the adjacent wall portion of the cylinder, including packing-rings, embodying my invention; and Fig. 2 is a partly sectional side view of a solid piston provided with my packing-rings and the adjacent walls of the cylinder.

Similar letters of reference designate corresponding parts in both figures.

Referring first to the example of my invention shown in Fig. 1, A designates the upright wall of the cylinder, against which works the piston. In this example of the invention the piston is composed of a body, B, and followers or bull rings B', made separate from the body and secured thereto in the usual way. In the piston are packing-rings C, which are acted upon in opposite directions by the steam or other motive fluid to produce a tight fit of the piston in the cylinder, whether the piston be moving in one or other direction.

Between each of the rings or followers B' and the body B of the piston is formed a groove, $b$, in which a packing-ring, C, is received. The opposite faces or walls $b'$ $b^2$ of this groove are parallel, and are formed the first on the ring or follower B' and the second upon the body B. The two faces or walls $b'$ $b^2$, in addition to being parallel, are oblique to the axis of the piston, and the rings C have their opposite sides parallel and correspondingly oblique to fit snugly within the grooves $b$. In the present example of my invention the width of the groove $b$ is formed entirely by a rabbet in the follower or ring B', and the followers or rings B' are of slightly less diameter than the body of the piston, so that a portion of the surface of the ring, as indicated at $c$, will be exposed to the pressure of the steam or other fluid, acting thereon in the direction indicated by the arrow in Fig. 1. This surface $c$, which is acted upon by steam, is here shown as flat in a plane which is substantially at right angles to the axis of the piston; and as the steam or motive fluid acts upon this surface $c$, tending to force the ring also in the direction indicated by the arrow applied thereto, the ring is forced against the oblique surface $b^2$, which is on the body of the piston, and is by it expanded or thrown out against the wall A of the cylinder, thereby forming a tight fit of the packing-ring within the cylinder. As the pressure of steam is changed from side to side of the piston, the ring last forced outward is relieved of pressure and contracts slightly, and there can be no striking or shock of the rings within their grooves, because there is no lost motion between the opposite sides of the rings C and the walls or faces $b'$ $b^2$ of the grooves $b$.

It is important that opposite faces $b'$ $b^2$ of the grooves $b$ and the corresponding faces of the rings C, fitting in said grooves, shall be in planes oblique to the axis of the piston, because then the pressure of steam acting upon the portion of the face of the ring which is exposed beyond the periphery of the piston will be enabled to force the ring down the inclined plane formed by the opposite face of the groove, and by so doing will force the ring outward against the wall of the cylinder.

The rings C may be sectional, or they may be simply cut at one point obliquely, as is usual in piston-rings, and not only is the action of the steam or other fluid upon the rings made very effective in expanding them tightly against the wall of the cylinder, but any slapping or striking of the rings in their grooves when they are alternately relieved of steam or other fluid is obviated.

In the example of my invention shown in Fig. 2 I have represented a solid piston, B, which has little grooves $b$, as before described, the opposite faces or walls $b'$ $b^2$ of the grooves being parallel and oblique to the axis of the piston. C designates the rings, whose opposite sides or faces are parallel and oblique correspondingly to the faces $b'$ $b^2$ of the grooves.

It will be observed that the piston on the outer side of each groove is made of slightly smaller diameter than on the inner side of the groove, and the portions of the rings C which are exposed to the steam or fluid pressure in these spaces are flat surfaces $c$, which are in a plane substantially at right angles to the axis of the piston.

It will be seen that by my invention I secure important advantages in ring-packing for pistons by an increase in the cost of manufacture which is immaterial. It will be but very little more expensive to form the piston with grooves having the opposite faces or walls oblique and to form the rings with correspondingly oblique sides than to form the grooves and rings with their opposite faces, walls, or sides in planes transverse to the axis of the cylinder.

Although the exposed surface $c$ is here shown as flat and in a plane substantially at right angles to the axis of the piston, it may be a continuation of the oblique face or side surface of the ring.

The formation of the piston groove and the piston-ring each with its opposite face parallel with each other and oblique to the axis of the piston results in important advantages. When the faces of the groove and ring are at right angles to the axis of the piston, the pressure of steam upon the face of the ring exposed beyond the periphery of the piston has not the same effect in forcing outward the ring against the wall of the cylinder as upon my ring, the faces of which are oblique to the axis of the piston. The sides of the groove and the ring are parallel, so that the ring may always fill the width of the groove, notwithstanding its outward movement therein, and not rattle.

What I claim as my invention, and desire to secure by Letters Patent, is—

1. The combination, with a piston having in its periphery a groove the opposite faces or walls of which are parallel with each other and oblique to the axis of the piston, of a packing-ring having its opposite sides also parallel and correspondingly oblique and fitting in said groove, substantially as herein described.

2. The combination, with a piston having in its periphery a groove the opposite faces or walls of which are parallel with each other and oblique to the axis of the piston, of a packing-ring having its opposite sides parallel and correspondingly oblique and fitting in said groove, the ring having that portion of its side on which the fluid acts and which projects beyond the piston a substantially flat surface in a plane at right angles to the axis of the piston, substantially as herein described.

3. The combination, with a piston having in its periphery a groove the opposite faces or walls of which are parallel with each other and oblique to the axis of the piston, and having a slightly greater diameter on one side than on the other side of said groove, of a packing-ring having its opposite sides parallel and correspondingly oblique and fitting said groove, and having that portion of its side which is exposed beyond the portion of the piston which is of smallest diameter a flat surface in a plane substantially at right angles to the axis of the piston, substantially as herein described.

4. The combination, with a piston-body and a follower or bull ring of smaller diameter, forming between them a peripherical groove the faces or walls of which are parallel with each other and oblique to the axis of the piston, of a packing-ring having its sides parallel and correspondingly oblique and fitting the groove, and having that portion of its side which is exposed beyond the follower or bull ring a flat surface in a plane at substantially right angles to the axis of the piston, substantially as herein described.

MICHAEL J. RUSSELL.

Witnesses:
MINERT LINDEMAN,
FREDK. HAYNES.